United States Patent [19]

Raleigh et al.

[11] 4,012,334

[45] Mar. 15, 1977

[54] ANTIFOAM COMPOSITIONS AND PROCESS FOR THE PREPARATION AND USE THEREOF

[75] Inventors: William J. Raleigh, Watervliet; Richard M. Ronda, Mechanicville, both of N.Y.

[73] Assignee: General Electric Company, Waterford, N.Y.

[22] Filed: Nov. 12, 1974

[21] Appl. No.: 523,280

[52] U.S. Cl. .............................. 252/321; 252/358
[51] Int. Cl.² ........................................ B01D 19/04
[58] Field of Search ........................... 252/321, 358

[56] References Cited

UNITED STATES PATENTS

| | | | |
|---|---|---|---|
| 2,894,913 | 7/1959 | Sullivan | 252/358 |
| 3,076,768 | 2/1963 | Boylan | 252/358 |
| 3,423,340 | 1/1969 | Bowdon et al. | 252/358 X |
| 3,560,403 | 2/1971 | O'Hara et al. | 252/358 |
| 3,730,907 | 5/1973 | Shane et al. | 252/358 |
| 3,856,701 | 12/1974 | Householder | 252/358 |

OTHER PUBLICATIONS

"The Condensed Chemical Dictionary", Litton Educational Publishing Inc., 1971, pp. 171-172.

*Primary Examiner*—Leland A. Sebastian
*Attorney, Agent, or Firm*—E. Philip Koltos; Edward A. Hedman; Rocco S. Barrese

[57] ABSTRACT

There are provided antifoam compositions comprising a dimethylpolysiloxane and a precipitated silica reacted with hexamethyldisilazane and a process for the preparation and use thereof.

22 Claims, No Drawings

ANTIFOAM COMPOSITIONS AND PROCESS FOR THE PREPARATION AND USE THEREOF

BACKGROUND OF THE INVENTION

This invention relates to foam-inhibiting compositions and more particularly to organosilicon-based antifoam compositions.

Basically, foam is a mass of bubbles created when some type of gas is dispersed into a liquid and the dispersion is then stabilized. As a result, high strength films of liquid surround the bubbles, forming large volumes of foam.

Generally, foam may be classified as desirable or undesirable. For example, the presence of foam is desirable in such industries as brewing, wine, ore flotation and fire extinguishing chemicals.

This invention, however, concerns itself with the prevention and/or destruction of undesirable foams. Undesirable foams and the problems related thereto are common, for example, in the petroleum industry, the asphalt industry, the food industry, ink industry, and the paper manufacturing industry. For example, if not properly controlled, foam can reduce equipment capacity and increase processing time and expense. Although foam can be controlled by making basic changes in a process itself, or by using mechanical defoaming equipment, chemical defoamers have proven to be the most effective and economical. By adding the chemical defoaming compositions to the system, stabilizing films are broken, causing the foam bubbles to vanish, thus completely defoaming the process.

Accordingly, many chemical compositions are known which are useful for the prevention and destruction of undesirable foams. Some of the most effective and versatile anti-foaming agents are the silicone defoamer. For example, it is well known that dimethylpolysiloxane will inhibit foam in lube oil systems. Foaming is highly detrimental in lubricants, since it reduces the quantity of oil fed to the moving parts of the apparatus being lubricated and therefore impedes proper lubrication action. It is theorized that the polydimethylsiloxane particles adhere to the bubble surfaces and break the foam.

Moreover, silicone fluids that are viscous liquids containing various dimethylpolysiloxanes and other polysiloxanes are used as antifoaming agents in bottling fruit juices and concentrating sugar; in cooking linseed oil varnishes; in dehydrating alkyd, melamine, urea, and phenol resins. Furthermore, dimethylpolysiloxane in combination with oleic acid when applied as an antifoaming agent in the preparation of penicillin results in greater separation and higher yields.

In the petroleum industry, oil well drilling fluids sometimes entrain sufficient air or gas to make them difficult to pump. Various defoamers have been used to break the foam and release the gas from the drilling fluid. Included among these defoamers are the silicones, alkylarensulfonates, castor oil, capryl alcohol, aluminum stearate and sulfonated vegetable oils.

A recently developed class of improved antifoam agents comprises dimethylpolysiloxane compositions containing untreated and/or treated fumed silica (e.g., fumed silica treated with octacyclotetrasiloxane). The general process by which these compositions are made requires that a mixture of the dimethylpolysiloxane fluid and the untreated and/or treated fumed silica filler is initially heated to about 150° C in order to disperse the filler. The mixture is then homogenized under pressure or milled and cooled. The mixture is then reheated to about 150° C for a considerable time to insure proper filler wet out. Finally, the mixture is again cooled and charged to a desired container for subsequent use.

Thus, as is evident from the above-described process, manufacture of this recently developed class of antifoam compositions is extremely costly and extremely time-consuming. In addition, the efficiency of the final products as defoamers has left room for considerable improvement.

SUMMARY OF THE INVENTION

Accordingly, it is one object of the present invention to provide improved organosilicone antifoam compositions.

Another object of this invention is to provide improved organosilicone antifoam compositions which are more efficient and less costly than similar compositions provided heretofore.

Still another object of the present invention is to provide a process for the preparation of organosilicone antifoam compositions which is less time-consuming, less cumbersome, and less costly than processes provided heretofore.

These and other objects are accomplished herein by providing an antifoam composition comprised of a polydimethylsiloxane fluid and a precipitated silica treated with hexamethyldisilazane and also by providing a unique method of preparation and use thereof.

DETAILED DESCRIPTION OF THE INVENTION

In accordance with the present invention, the antifoam compositions are prepared by initially treating the precipitated silica filler with the hexamethyldisilazane to form a reaction product. In this procedure, the precipitated silica is treated with by simply admixing the same with the hexamethyldisilazane in the absence of the dimethylpolysiloxane fluid at a temperature of from about 25° to about 150° C from about 1 to 2 hours and preferably at room temperature for about 1 hour. Ammonia is liberated as a by-product. The resultant so-treated precipitated silica is subsequently thoroughly admixed with an appropriate dimethylpolysiloxane fluid while heating the admixture at a temperature of about 150° C for about 2 to about 7 hours. The resultant antifoam composition is then cooled and charged to a suitable vessel for storage.

It has been surprisingly discovered that, in contrast to prior art procedures, no milling or homogenization steps are required to obtain a suitable product when the present antifoam compositions are prepared according to the hereinabove described process. That is, when the precipitated silica filler is treated with the hexamethyldisilazane in the manner described above, it is found that filler particles sufficiently wet out and are of a sufficiently small average size (less than one micron) to avoid the necessitation of the time consuming and costly steps of homogenization and/or milling.

With regard to the materials used in the present antifoam compositions, any of the well-known linear dimethylpolysiloxane fluids having a viscosity in the range of from about 100 to about 70,000 centistokes at 25° C are suitable for the present purposes. For example, dimethylpolysiloxane fluids represented by the following general formula are suitable:

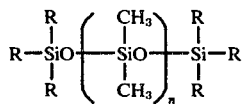

(I)

where R is the same or different and selected from monovalent hydrocarbon and substituted hydrocarbon radicals, such as aliphatic, haloaliphatic and cycloaliphatic, e.g., alkyl, alkenyl, cycloalkyl, haloalkyl, including methyl, ethyl, propyl, butyl, chlorobutyl, cyclohexyl, trifluoropropyl, aryl radicals, and halogenated aryl radicals, such as phenyl, chlorophenyl; alkenyl radicals such as xylyl, tolyl, and the like; aralkyl radicals, such as phenylethyl, benzyl, and the like; cyanoalkyl, such as cyanoethyl; and n is sufficient to provide a viscosity of from about 100 to about 70,000 centistokes at 25° C. Preferably, all the R groups in the above formula are methyl, and it is also preferred that the viscosity of the dimethylpolysiloxanes used in the practice of this invention is from about 100 to about 30,000 centistokes at 25° C and most preferably from about 300 to about 1,000 centistokes at 25° C.

Any of the well-known and/or commercially available precipitated silica fillers are useful in the practice of the present invention. These precipitated silica fillers are high surface area materials, the surface area generally being in the range of from about 100 to about 800 $m^2/g$ and are generally prepared by the depolymerization of high purity sand, which is a crystalline form of silica, to produce soluble silicate, which in turn is treated to cause repolymerization and precipitation of extremely particulate amorphous filler. The resultant silica is a fine white powder, the particles of which have fully hydroxylated surfaces, covered by moisture layers. For purposes of this invention the moisture content is generally in the range of from about 1 to about 15% by weight. Most preferably, the precipitated silicas employed herein have a moisture content of from about 7 to about 10% by weight.

Specifically, preferred precipitated silica fillers useful in the practice of the present invention are commercially available from, for example, the Philadelphis Quartz Company, sold under the name of QUSO-F22; SCM Glidden Durkee Company, sold as Silcron G-100; the J. M. Huber Corp., sold as Zeothex 95; and the W. R. Grace Co., sold as Syloid 266. All of these precipitated silica fillers are generally identified as hydrated silicon dioxide having a surface area of from about 300 to 400 $m^2/g$, having a moisture content of from about 7 to about 10% by weight.

The hexamethyldisilazane used in the antiform compositions of the present invention is a well-known compound and has the formula $(CH_3)_3Si—NH—Si(CH_3)_3$. It is readily prepared by the reaction of trimethylchlorosilane with ammonia in the presence of a suitable inert solvent, such as diethyl ether, benzene or carbon tetrachloride.

The amounts of the ingredients employed to prepare the antifoam compositions of the present invention may vary within wide limits. Generally, however, the dimethylpolysiloxane fluid comprises from about 60 to 99% by weight of the total composition while the amount of hexamethyldisilazane treating agent used is from about 8 to 20% by weight, based on the amount of precipitated silica filler employed. Generally, the amount of precipitated silica filler used in the practice of this invention is from about 1 to about 40% by weight. Preferably, however, the antiform compositions of this invention contain from about 3 to about 8% by weight of the treated precipitated silica filler and from about 92 to about 97% by weight of the dimethylpolysiloxane. Of course, other additives which are generally used in antifoam compositions of the present type are also contemplated herein in minor amounts. These materials include, for example, oleic acid, which is employed, for example, to aid filler wet out and sorbic acid which is used as a bacteriacide.

For non-aqueous systems, the present antifoam compositions are used in a form which is commonly referred to as a 100% silicone solids antifoam compound, which is either undiluted or diluted with a suitable solvent. On the other hand, for use in aqueous systems, the present antifoam compositions are used in the form of conventional water-containing solutions, dispersions or emulsions employing conventional detergents, dispersing agents, suspending agents and/or emulsifying agents such as polyoxyethylene sorbitan monostearate (Tween 60), sorbitan monostearate (Span 60), polyoxyethylene (40) stearate (Myrj 52), and mixtures thereof. When used in the form of an aqueous solution, dispersion or emulsion, the antiform compositions of the present invention are generally comprised of from about 5 to about 75%, preferably from about 10 to about 30%, by weight of the 100% silicone solids composition as described hereinabove, from about 1 to about 25%, preferably from about 4 to about 15% by weight dispersing, suspending and/or emulsifying agent, and from about 90 to about 60% water. Other additives, such as oleic acid, sorbic acid and thickening agents such as carboxymethyl cellulose, which are generally employed in antifoam solutions, dispersions or emulsions of this type are also contemplated herein in minor amounts. A preferred thickening agent within the scope of the present invention is CMC-7H, carboxymethyl cellulose, sold by Hercules Chemical Co.

The present antiform solutions, dispersions or emulsions are prepared in a conventional manner which generally comprises thoroughly mixing the 100% silicone solids antifoam compositions prepared according to the present invention with the above-described suspending, dispersing and/or emulsifying agents in the presence of water and passing the resultant mixture through a colloid mill.

Included among the advantages of the present antifoam compositions is their ability to deform and prevent foam even when employed at low concentrations. Generally when employed in undiluted form, i.e., 100% silicone solids, a concentration of from about 10 to 1,000 parts per million and preferably 100 parts per million are used. In the form of an aqueous solution, suspension or emulsion, concentrations of from about 10 to about 1,000, and preferably 500 parts per million, are suitable. Of course, these concentrations are dependent upon several factors including the system desired to be defoamed and the particular desires of the user.

In order that those skilled in the art may better understand how the present invention is practiced, the following examples are presented by way of illustration and not by way of limitation.

EXAMPLE 1

1.5 parts by weight of hexamethyldisilizane are admixed in a suitable vessel with 7.5 parts by weight of precipitated silica filler (commercially available from the SCM Glidden Durkee Company and sold as Silcron G-100) at room temperature for about one hour. While heating the admixture to from about 100° to 150° C and continuing the agitation, 92.5 parts by weight of a dimethylpolysiloxane fluid, according to general Formula I hereinabove wherein all the R groups are metyl and having a viscosity of about 500 centipoise at 25° C, are added thereto. The temperature of the resultant admixture is maintained at about 150° C for an additional 4 hours. The vessel and its contents are cooled and the resultant antifoam composition is removed and charged to an appropriate storage container.

EXAMPLE 2

This example illustrates the preparation of an antifoam emulsion composition according to the present invention.

46.0 parts by weight of water are charged to an appropriate premix vessel and heated to 60°–70° C. At the same time 195 parts by weight of water are charged to a dilution vessel and also heated to 60°–70° C. 0.2 and 0.1 parts by weight of CMC-7H, a thickener, are charged to the premix vessel and the dilution vessel, respectively, while maintaining the temperature at about 60° C. Both the premix vessel and dilution vessel are rapidly agitated for one hour. 2.2 parts by weight of sorbitan monostearate (Span 60) and 1.8 parts by weight polyoxyethylene stearate (Myrj 52) are added to the premix vessel while maintaining the temperature at 60°–70° C. Agitation is continued for about 30 minutes after addition is completed. The dilution vessel is cooled to a temperature of about 40° to 50° C and mild agitation is maintained. 30.0 parts by weight of the antifoam composition of Example 1 is then slowly added with mild agitation to the premix vessel while maintaining the temperature above 60° C. The premix vessel is then stirred for about 15–30 minutes with rapid agitation. After the premix vessel is agitated accordingly, it is cooled to about 57° C and the contents are milled on a Manton-Gaulin colloid mill at approximately 4–6 mils into the contents of the dilution vessel. This blend is then agitated for about 15–30 minutes and sorbic acid is added thereto and again agitated for about 1 hour to obtain a uniform blend. The final blend is filtered, if necessary and transferred to a storage container for subsequent use.

EXAMPLES 3 and 4

The antiform compositions of Examples 3–4, as shown in Table I, are prepared similarly to that of Example 1. For summary purposes, Table I also includes the composition of Examples 1 and 2 and accompanying test data.

Table I

| Example No. | Precipitated silica | Dimethylpolysiloxane 500 centistokes at 25° | Hexamethyl-disilazane | Defoam Effectiveness | Comments on Foam kill |
| --- | --- | --- | --- | --- | --- |
| 1 | 7.5 parts by weight | 92.5 parts by weight | 1.5 parts by weight | 0.32 mg/ml | Very fast |
| 2 | (30% emulsion prepared from the composition of Example 1) | | | 0.18 mg/ml | Very fast |
| 3 | 10 parts by weight | 90 parts by weight | 1.5 parts by weight | 0.35 mg/ml | Very fast |
| 4 | 5.1 parts by weight | 94.9 parts by weight | 1.5 parts by weight | 0.42 mg/ml | Very fast |

The defoam efficiency is obtained by the following test procedures.

1. To a 1500 ml. beaker which has been arranged for mixing with a mixer is added 200 ml. of distilled water. The mixer is equipped with two beaters and the mixer is turned on at maximum speed.
2. 0.5% sodium lauryl sulfate solution is added to the beaker at a maximum rate until a foam height which just covers the beaters is formed.
3. Enough antifoam composition sample is added to collapse the foam (usually 1 to 2 drops).
4. After the foam level has subsided the 0.5% sodium lauryl sulfate solution is again added in the same manner as step 2.
5. 2 drops of antifoam composition sample is added.
6. The mixer is shut off after the foam level has subsided.

The time interval between the following is no longer than 10 minutes.

7. A weighing bottle containing approximately 10 grams of sample and a medicine dropper is weighed to ± 0.001 gms. The weight is recovered in $W_1$.
8. The mixer is turned on to maximum speed. Step 2 and step 3 are repeated (noting the volume of reagents used) until five successive additions of reagent and sample are made. The sample in the weighing bottle is used here. 9. The weight of the weighing bottle with sample and dropper is recorded as $W_2$.
10. The total volume of each of the five additions of sodium lauryl sulfate added in step 8 is recorded as $V_t$. $V_t$ is divided by 5 to obtain the average volume, $V_a$. The average is divided by 4. Add and subtract this result to $V_a$ to give the range $V_L$–$V_u$. Compare each of the five individual volumes to this range. They must fall within the range or else the test is to be repeated.
11. Calculate the ratio, $R_1$ of the total weight in mgm of sample used to the total volume in ml of sodium lauryl sulface used.

$$R = \frac{W_1 - W_2}{V_T}$$

12. Convert milligrams and sample/ml of sodium lauryl sulfate solution to mg. silicone/ml as follows:

$$\text{mg. silicone/ml} = \frac{R}{f}$$

where $f$ is a numerical factor of the amount of silicone in the antifoam composition.

A defoam efficiency in the range of 0.3 mg/ml to about 1.0 mg/ml is generally acceptable; however, a maximum of 0.5 mg/ml is preferred.

Obviously, other modifications and variations of the present invention are possible in light of the above teachings. It is therefore to be understood that changes may be made in the particular embodiments of this invention which are within the full intended scope of the invention as defined by the appended claims.

What is claimed and desired to be secured by Letters Patent is:

1. An antifoam composition comprising:
   a. a linear dimethylpolysiloxane fluid having the general formula

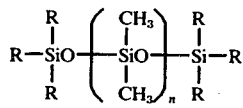

wherein R is the same or different and is selected from the group consisting of hydrocarbon radicals and substituted hydrocarbon radicals and n is a number sufficient to provide a viscosity of from about 100 to about 70,000 centistokes at 25° C in intimate admixture with
   b. the reaction product of precipitated silica filler and hexamethyldisilazane prepared by contacting precipitated silica with hexamethyldisilazane in the absence of the dimethylpolysiloxane fluid of component (a).

2. An antifoam composition as defined in claim 1, wherein said precipitated silica has a surface area in the range of from about 100 to about 800 m²/g, and a moisture content of from about 1 to about 15% by weight.

3. An antifoam composition as defined in claim 1, wherein said reaction product is prepared by contacting precipitated silica with hexamethyldisilazane at a temperature in the range of from about 25° to about 150° C.

4. An antifoam composition as defined in claim 1, wherein R is the same or different and is selected from the group consisting of aliphatic radicals, haloaliphatic radicals, cycloaliphatic radicals, cyanoalkyl radicals, aryl radicals, alkaryl radicals, haloaryl radicals, and aralkyl radicals.

5. An antifoam composition as defined in claim 4, wherein R is the same and is methyl and n is a number sufficient to provide a viscosity in the range of from about 300 to about 1,000 centistokes at 25° C.

6. An antifoam composition as defined in claim 5, wherein said precipitated silica has a surface area of from about 300 to about 400 m²/g amd a moisture content of from about 7 to about 10% by weight.

7. A process for preparing an antifoam composition the steps of: (a) contacting a precipitated silica filler with hexamethyldisilazane at a temperature from about 25° to about 150° C; and (b) admixing the reaction product resulting from step (a) with a dimethylpolysiloxane fluid having the general formula

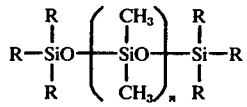

wherein R is the same or different and is selected from the group consisting of hydrocarbon radicals and substituted hydrocarbon radicals, and n is a number sufficient to provide a viscosity of from about 100 to about 70,000 centistokes at 25° C.

8. A process as defined in claim 7, wherein said precipitated silica filler has a surface area in the range of from about 100 to about 800 m²/g and a moisture content of from about 1 to about 15% by weight.

9. A process as defined in claim 7, wherein R is the same or different and is selected from the group consisting of aliphatic radicals, haloaliphatic radicals, cycloaliphatic radicals, cyanoalkyl radicals, aryl radicals, alkenyl radicals, haloaryl radicals and aralkyl radicals.

10. A process as defined in claim 9, wherein R is the same and is methyl and n is a number sufficient to provide a viscosity in the range of from about 500 to about 5,000 centistokes at 25° C.

11. A process as defined in claim 10, wherein said precipitated silica filler has a surface area in the range of from about 300 to about 400 m²/g and a moisture content of from about 7 to about 10% by weight.

12. The antifoam composition of claim 1 further comprising water and a material selected from the group consisting of an emulsifying agent, a suspending agent, a dispersing agent, a thickening agent and mixtures thereof.

13. The antifoam composition of claim 6 further comprising water and a material selected from the group consisting of an emulsifying agent, a suspending agent, a dispersing agent, a thickening agent and mixtures thereof.

14. The antifoam composition of claim 1 further comprising water, sorbitan monostearate, polyoxyethylene stearate, and carboxymethyl cellulose.

15. The antifoam composition of claim 6 further comprising water, sorbitan monostearate, polyoxyethylene stearate, and carboxymethyl cellulose.

16. The antifoam composition of claim 15 further comprising sorbic acid.

17. A process for preventing and/or destroying undesired foam comprising admixing a foam inhibiting amount of the antifoam composition of claim 1 with a liquid composition comprising undesired foam or characterized with the ability to produce undesired foam.

18. A process for preventing and/or destroying undesired foam comprising admixing a foam inhibiting amount of the antifoam composition of claim 6 with a liquid composition comprising undesired foam or characterized with the ability to produce undesired foam.

19. A process for preventing and/or destroying undesired foam comprising admixing a foam inhibiting amount of the antifoam composition of claim 13 with a liquid composition comprising undesired foam or characterized with the ability to produce undesired foam.

20. A process for preventing and/or destroying undersired foam comprising admixing a foam inhibiting amount of the antifoam composition of claim 14 with a liquid composition comprising undesired foam or characterized with the ability to produce undesired foam.

21. A process for preventing and/or destroying undesired foam comprising admixing a foam inhibiting amount of the antifoam composition of claim 15 with a liquid composition comprising undesired foam or characterized with the ability to produce undesired foam.

22. A process for preventing and/or destoying undesired foam comprising admixing a foam inhibiting amount of the antifoam composition of claim 16 with a liquid composition comprising undesired foam or characterized with the ability to produce undesired foam.

* * * * *

UNITED STATES PATENT AND TRADEMARK OFFICE
CERTIFICATE OF CORRECTION

PATENT NO. : 4,012,334
DATED : March 15, 1977
INVENTOR(S) : W. J. Raleigh et al

It is certified that error appears in the above-identified patent and that said Letters Patent are hereby corrected as shown below:

Claim 7, line 1, after "composition" insert --comprising--;

line 4, after "150°C" insert --, to form a reaction product--.

Claim 22, line 1, "destoying" should be --destroying--.

Signed and Sealed this

Fourteenth Day of June 1977

[SEAL]

Attest:

RUTH C. MASON
Attesting Officer

C. MARSHALL DANN
Commissioner of Patents and Trademarks